United States Patent [19]

Blatter

[11] Patent Number: 4,547,023
[45] Date of Patent: Oct. 15, 1985

[54] CIRCULATING ROLLER BEARING
[75] Inventor: Albrecht Blatter, Roggwil, Switzerland
[73] Assignee: W. Schneeberger AG, Maschinenfabrik, Roggwil, Switzerland
[21] Appl. No.: 593,290
[22] Filed: Mar. 23, 1984
[30] Foreign Application Priority Data Apr. 18, 1983 [CH] Switzerland ............... 2060/83

[51] Int. Cl.[4] ........................................... F16C 29/06
[52] U.S. Cl. ................................................. 308/6 C
[58] Field of Search ....................... 308/6 C, 6 R, 6 A; 464/168

[56] References Cited
U.S. PATENT DOCUMENTS 3,466,101  9/1966  Hudson ............................. 308/6 C
3,937,532  2/1976  Fuhrmann et al. ................ 308/6 C
4,025,995  5/1977  Thomson .......................... 308/6 C
4,201,424  5/1980  Ernst et al. ....................... 308/6 C Primary Examiner—Lenard A. Footland
Attorney, Agent, or Firm—Werner W. Kleeman

[57] ABSTRACT

A circulating roller track or raceway is formed in a bearing block formed as a one-piece injection molding. The circulating roller track is interrupted by a bearing track or bearing raceway insert. The bearing track is raised above the plane of the circulating track and transitional ramp surfaces are provided. This bearing raceway insert has a mounting surface at the exterior of the bearing block at a calibrated distance or spacing from the bearing portion of the roller raceway. Thus only two precision components, a roller member and a bearing raceway insert, are required to obtain an accurate spacing between two mutually guided or bearing components.

17 Claims, 8 Drawing Figures

CIRCULATING ROLLER BEARING

BACKGROUND OF THE INVENTION

The present invention broadly relates to roller or ball bearings and, more specifically, pertains to a new and improved construction of a circulating roller or ball bearing intented to cooperate with a bearing surface of a further machine component.

Generally speaking, the circulating roller bearing contains a housing which comprises a bearing block incorporating a roller or ball raceway having a bearing portion and a circulating portion in which roller members are sequentially arranged to roll between the raceway and the bearing surface of the other machine component to form supporting or bearing means therebetween.

Usually such roller or ball bearings—also referred to as linear bearings—are manufactured with stringent requirements of precision and at corresponding expense. All components thereof must be highly precise in their inter-relationships.

SUMMARY OF THE INVENTION

Therefore, with the foregoing in mind it is a primary object of the present invention to provide a new and improved construction of a circulating roller or ball bearing which does not have associated with it the aforementioned drawbacks and shortcomings of the prior art constructions.

Another and more specific object of the present invention aims at providing a new and improved construction of a circulating roller or ball bearing of the previous mentioned type which can be cheaply manufactured without sacrificing precision.

Yet a further specific object of the present invention aims at providing a new and improved construction of a circulating roller or ball bearing of the character described which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description procedes, the circulating roller bearing of the present invention is manifested by the features that the bearing portion of the roller raceway is arranged in a plane extending substantially parallel to a further plane in which the circulating portion of the roller raceway is arranged, such circulating portion of the roller raceway being formed in the bearing block and being interrupted by the bearing portion of the roller raceway. The bearing block can be made of a suitable plastic material, such as polyamide, and, in particular, can be injection molded in a single piece, so that its manufacture in large quantities is very economical. Experience has shown that the usual precision of plastic injection molding, such as is employed for injection-molded engineering articles, is sufficient. The high degree of accuracy required for precise cooperation with other machine components can be limited to the bearing portion of the roller raceway and the roller members themselves.

Thus, if the bearing raceway insert or bearing portion of the roller raceway extends through the bearing block, then its mounting surface, which desirably extends at a calibrated distance or spacing from the raceway bearing surface, can be intimately mounted on a further machine component with precision while the roller members rolling on the bearing portion of the roller raceway rollingly and bearingly engage a roller bearing surface of another machine component.

Roller members of correspondingly precise calibration are commercially manufactured and available. In addition to such roller members, only the bearing raceway insert need be manufactured precision. Since the latter is small and of simple configuration and uniform dimension, it presents no difficulties of fabrication, including hardening.

The bearing raceway insert or bearing portion of the roller raceway preferably protrudes from the plane of the circulating portion of the roller raceway, which assures that only unloaded roller members travel in the circulating portion of the roller raceway. This has the advantage that no stringent requirements need be imposed upon the plastic or other material. In order that the roller members may enter the bearing portion from the circulating portion of the roller raceway and again leave the bearing portion without abrupt changes in load, transition structures are provided on the bearing raceway insert in the form of sloping ramps. The manufacture of such ramp surfaces requires no special precision.

If the roller members employed have the form of cylindrical rollers, it is preferable to provide spacer or separator members, especially in view of the fan-like diversion or guiding of such rollers in the diverting or turning regions of the circulating roller raceway. Such spacer or separator members are not necessary for roller members having the form of spherical ball bearings, but could be provided if desired.

Spacer or separator members between roller members should preferably comprise concave and mutually opposing roller guide surfaces. Such roller guide surfaces preferably each comprise a portion or region extending substantially parallel to a corresponding such portion or region of the opposing roller guide surface for guiding the rollers along the straight regions of the roller raceway and a portion or region converging in wedge-shape fashion toward a corresponding such portion or region of the opposing roller guide surface for guiding the roller members in their fan-shaped turning path. The transition between these portions or regions of the roller guide surfaces can be relatively angular, but a certain degree of rounding or curvature for transitional guidance should nevertheless be provided.

In order to assure good smooth circulation in the turning or diverting regions of the roller raceway, it is advantageous to form the external or peripheral end faces of the spacer or separator members approximately cylindrically.

It is also advantageous in promoting smooth circulation to provide the external or peripheral end faces of the roller members with a domed end face, i.e. to form this face with a substantially spherical bulge. This assures that they contact the guide surfaces of the circulating raceway only at a central domed region which reduces friction and damage to the guiding surface.

In order that the roller members and, if provided, the spacer or separator members be prevented from falling or jumping out of the circulating raceway while still forming the latter as an open channel, it is advantageous to provide the raceway with correspondingly protruding edges or lips at its terminal edges. These protruding edges or lips can be wedge-shaped in cross-section, so that they interact well with the form of a spherical ball bearing roller member or with the form of a cylindrical roller bearing roller member having a chamfer at one end and a domed surface at the other.

If a correspondingly elastic material is employed for the circulating raceway, the roller members and, if provided, the spacer or separator members can be pressed into the channel opening of the circulating raceway by elastically deforming the abovementioned protruding edges or lips which considerably facilitates assembly.

The introduction of the roller members and, if provided, the spacer or separator members into the raceway can also take place through the opening into which the bearing raceway insert is subsequently installed. The latter may also be retained in place by elastic deformation of the plastic material.

The preferably plastic bearing block can be so formed that it is capable of engaging a further machine component, e.g. in a corresponding recess, by means of elastic deformation or it can be provided with holes or inserts serving for mounting by means of threaded members.

In any event, no stringent requirements of precision are placed on the preferably plastic bearing block, since it is the thickness or depth of the bearing raceway insert, i.e. the calibrated distance or spacing of the mounting surface from the bearing raceway surface and the diameter of the roller members that is important, which is technically realizable to the highest degree of precision at reasonable cost.

Thus it is possible to create a circulating ball bearing with only three types of components and a circulating roller bearing with only four types of components, only two of which, i.e. the bearing surface insert and the balls or rollers, need to be precisely manufactured, while the remaining components require only the lesser degree of precision readily obtainable in plastic injection molding. The effort and expense of manufacture is correspondingly low, so that linear circulating roller or ball bearings can for the first time be standardized and economically produced in a manner comparable to normal radial roller bearings.

BRIEF DESCRIPTION OF THE DRAWINGS

The invention will be better understood and objects other than those set forth above, will become apparent when consideration is given to the following detailed description thereof. Such description makes reference to the annexed drawings wherein through the various figures of the drawings there have been generally used the same reference characters to denote the same or analogous components and wherein.

DETAILED DESCRIPTION OF THE PREFERRED EMBODIMENTS

Figure 1:
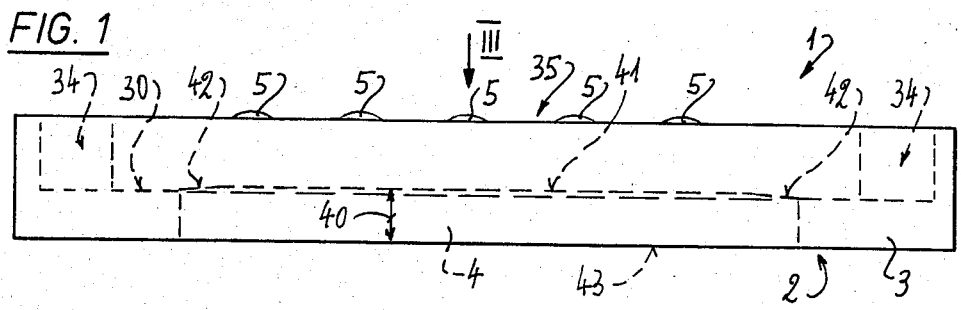
FIG. 1 is a side view of a circulating bearing.
Figure 2:
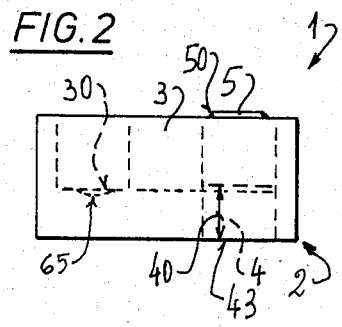
FIG. 2 is an end view of the bearing according to FIG. 1.
Figure 4:
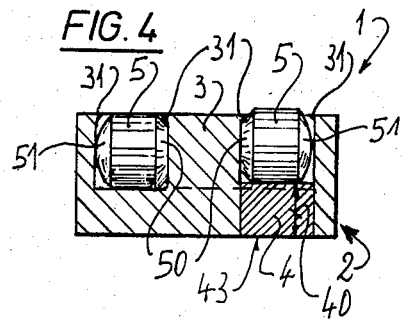
FIG. 4 is a schematic cross section on the line 4—4 in FIG. 3.
Figure 3:
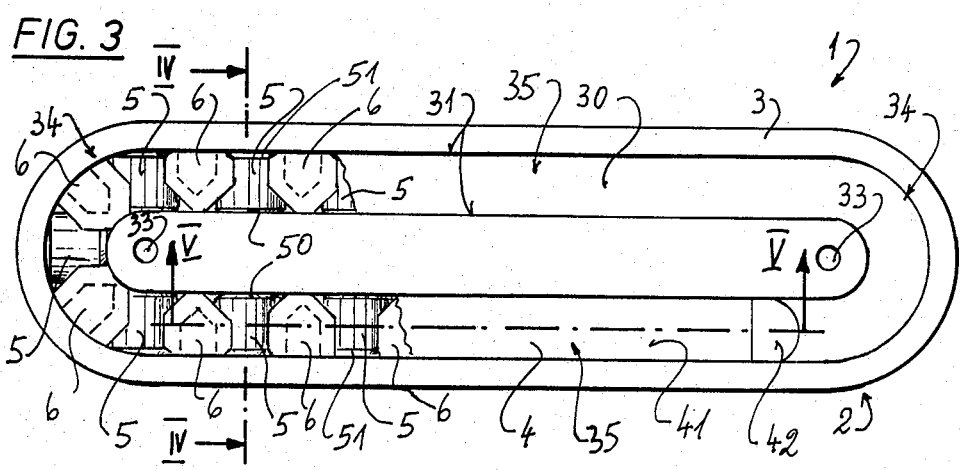
FIG. 3 is a schematic plan view in the direction of arrow 3 in FIG. 3.

Describing now the drawings, it is to be understood that to simplify the showing of the drawings only enough of the structure of the circulating roller or ball bearing bearing has been illustrated therein as is needed to enable one skilled in the art to readily understand the underlying principles and concepts of this invention. The illustrated exemplary embodiment of the circulating roller or ball bearing 1 will be seen to comprise a housing 2 including a bearing block 3, which may be of plastic, and a bearing raceway insert 4.

The bearing block 3 is provided with a channel-shaped circulating portion 30 of a roller raceway which comprises inwardly protruding edges or lips 31 at its terminal edges to prevent cylindrical roller members 5 and spacer or separator members 6, or alternatively spherical ball roller members 7, circulating in the raceway from falling or jumping out. The rolling surface of the channel-shaped raceway may be formed to have a groove 65 for engaging the spherical ball roller members 7, such as a cylindrical or V-groove. For engaging substantially cylindrical roller members, it is preferably flat-bottomed.

The bearing block 3 is provided with an opening or aperture 32 for accommodating the bearing raceway insert 4 with a press fit and into which the bearing raceway insert 4 is forcibly pressed. Mounting holes 33 are also provided.

The bearing raceway insert 4 has two precision surfaces located at a calibrated distance or spacing 40 from one another, i.e. the bearing raceway surface 41 with its entry and exit ramps 42 and a mounting surface 43 opposite and parallel thereto. The bearing raceway surface 41 protrudes from the plane of the circulating raceway 30 and communicates therewith by the sloping ramp surfaces 42.

Figure 5:
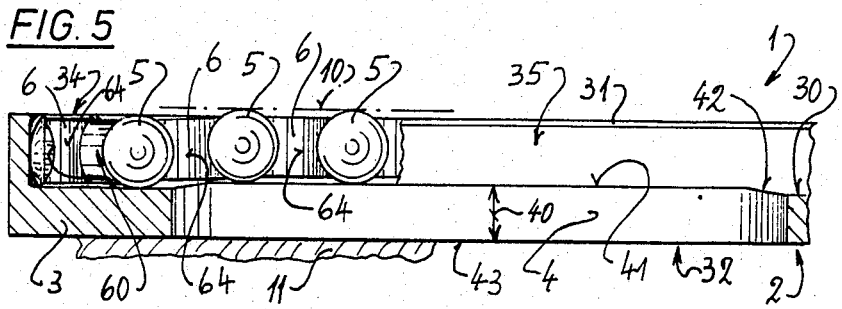
FIG. 5 is a partial schematic longitudinal section on line 5—5 in FIG. 3.
Figure 6:
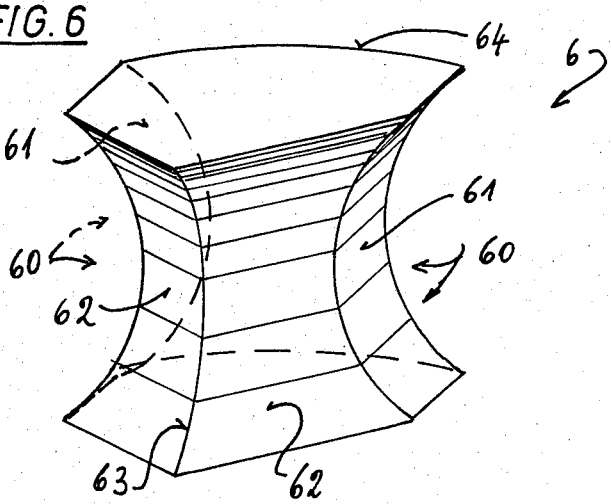
FIG. 6 is a schematic perspective view of a spacer member at an enlarged scale.
Figure 7:
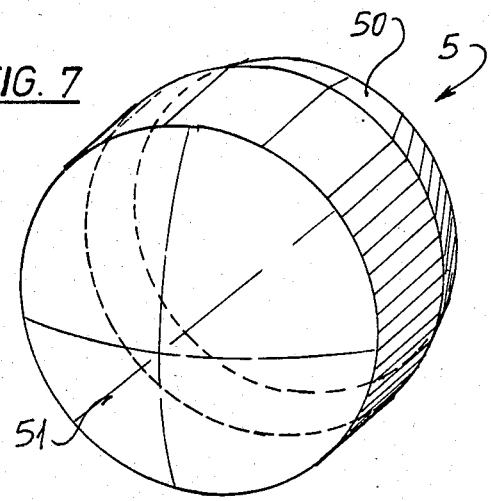
FIG. 7 is a schematic perspective view of a roller member at an enlarged scale.
Figure 8:
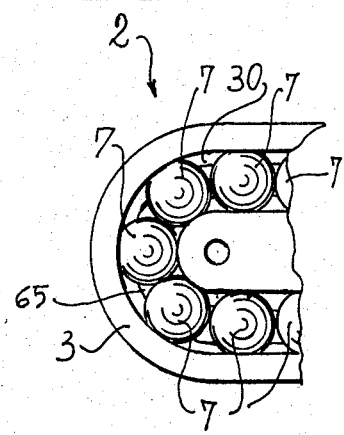
FIG. 8 is a schematic partial plan view of a circulating roller bearing containing ball roller members.

In FIG. 5, a roller bearing surface 10 of another machine component is indicated in broken lines to demonstrate that only the calibrated distance or spacing 40 of the bearing raceway insert 4 and the diameter of the roller members 5 or ball rollers 7 need be precise, since a further machine component 11 can be in intimate contact with the mounting surface 43.

The roller members 5 are provided with a slight chamfer 50 at their interior or central end faces so that they cooperate well with the protruding edges or lips 31 of the raceway channel while they are provided with a domed surface 51 at their external or peripheral end faces to minimize the guiding friction at the outer surface of the channel-shaped raceway and to eliminate interference therewith in the turning or diverting portions 34 of the circulating roller raceway 30.

It will be understood that spherical ball bearing members 7 are inherently domed and therefore cooperate well with the protruding edges or lips 31 and maintain themselves in mutually constant center-to-center spacing in the turning or diverting regions 34 of the roller raceway.

On the other hand, the cylindrical roller members 5 need the spacer or separator members 6. The roller guide surfaces 60 of the spacer or separator members 6 guide the cylindrical roller members 5 in the substantially straight portion 35 of the circulating roller raceway 30 with their parallel portions or regions 61 and in the turning and diverting portions 34 of the circulating roller raceway 30 with their converging portions or regions 62. An arris or corner region 63 can be formed more roundedly than is shown in the drawings. This arris or corner region 63 guides the roller members in the transition region between the straight path and the turning or diverting path. The external or peripheral surface 64 is cylindrically formed to reduce friction.

The exemplary embodiment of the circulating roller or ball bearing 1 can be employed in many different ways. It is suitable for practically all forms of guidance, e.g. columns of rectangular cross-section, round columns, prisms etc. The circulating roller bearing can be inserted into a recess or fastened through holes 33 without requiring a high degree of precision, since only the dimensions of the bearing raceway insert 4 and of the roller members 5 or 7 are determinant and the remaining structure requires only moderate precision.

In general, spherical ball bearings will be cheaper than cylindrical roller bearings, since the spacer or separator members 6 may be omitted. However, as is well known, ball bearings cannot be as heavily loaded as roller bearings. In either case, an economically advantageous and suitably precise guidance means can be produced.

The circulating roller bearing can be assembled by introducing the rollers 5 or the balls 7 and the spacer or separator members 6 through the opening or aperture 32 before pressing in the bearing raceway insert 4 or may be introduced through the open side of the channel-shaped roller raceway 30.

While there are shown and described present preferred embodiments of the invention. it is to be distinctly understood that the invention is not limited thereto, but may be otherwise variously embodied and practiced within the scope of the following claims.

Accordingly, what I claim is:

1. A circulating roller bearing for cooperating with a bearing surface, comprising:
a housing comprising a bearing block made of plastic material and incorporating a roller raceway having a bearing portion and a circulating portion in nearly co-planar relationship;
rollers sequentially arranged in said raceway;
said rollers rolling between said raceway and said bearing surface;
said circulating portion being formed in said bearing block;
said bearing portion being constructed as a bearing raceway insert having a raceway surface and exending through said bearing block and interrupting said circulating portion;
said bearing raceway insert having a mounting surface in a calibrated spaced relationship to said raceway surface;
said bearing portion having sloping ramp end regions defining transitions between said bearing portion and said circulating portion;
spacer members provided between said rollers; and
said spacer members being provided with concave roller quide surfaces, each of which comprise mutually substantially parallel roller guide surface portions and mutually convergent roller guide surface portions.

2. The circulating roller bearing as defined in claim 1, wherein:
said roller raceway is arranged substantially parallel to the bearing surface.

3. The circulating roller bearing as defined in claim 1, wherein:
said bearing portion of the roller raceway is metallic.

4. The circulating roller bearing as defined in claim 1, wherein:
said first plane of said bearing portion is arranged closer to the bearing surface than said second plane of said circulating portion; and
said bearing portion comprising sloping ramp regions defining transitions between said bearing portion and said circulating portion.

5. The circulating roller bearing as defined in claim 1, wherein:
at least said bearing portion is formed of steel.

6. The circulating roller bearing as defined in claim 1, wherein:
at least said bearing portion is formed of hard metal.

7. The circulating roller bearing as defined in claim 1, wherein:
said rollers comprise essentially cylindrical bearing rollers, 8. The circulating roller bearing as defined in claim 7, wherein:
said raceway is provided with a substantially flat bearing surface.

9. The circulating roller bearing as defined in claim 1, wherein:
said rollers comprise essentially cylindrical rollers;
said spacer members being provided with concave roller guide surfaces; and
said roller guide surfaces each comprising mutually parallel roller guide surface portions and mutually convergent roller guide surface portions.

10. The circulating roller bearing as defined in claim 9, wherein:
said roller guide surfaces of said spacer members essentially conform to a substantially cylindrical spatial envelope.

11. The circulating roller bearing as defined in claim 1, wherein:
said rollers comprise essentially cylindrical bearing rollers having domed end guide surfaces.

12. The circulating roller bearing as defined in claim 1, wherein:
said bearing block comprises a single piece structure.

13. The circulating roller bearing as defined in claim 1, wherein:
said circulating portion of said roller raceway is formed in a channel of said bearing block.

14. The circulating roller bearing as defined in claim 13, wherein:
said channel comprises laterally protruding terminal edges;
lip structures arranged at said laterally protruding terminal edges; and
said lip structures preventing said roller members from disengaging from said channel.

15. The circulating roller bearing as defined in claim 13, wherein:
said channel comprises laterally protruding terminal edges;
lip structures arranged at said laterally protruding terminal edges; and
said lip structurespreventing said spacer members from disengaging from said channel.

16. A circulating roller bearing for cooperating with a bearing surface, comprising:
a housing comprising a bearing block incorporating a roller raceway having a bearing portion and a circulating portion;

rollers having a predetermined diameter and sequentially arranged in said raceway;
said bearing portion of said bearing raceway being arranged substantially in a first plane;
said circulating portion of said roller raceway being arranged substantially in a second plane;
said first plane and said second plane being mutually substantially parallel and spaced apart by a dimension less than said predetermined diameter of said rollers;
said rollers rolling between said raceway and said bearing surface;
said circulating portion being formed in said bearing block;
said bearing portion being constructed as a bearing raceway insert having a raceway surface defined by said first plane and extending through said bearing block and interrupting said circulating portion;
said bearing raceway insert having a mounting surface in a predetermined spaced relationship to said raceway surface;
said bearing portion having sloping ramp end regions defining transitions between said bearing portion and said circulating portion;
spacer members provided between said rollers; and
said spacer members being provided with concave roller guide surfaces, each of which comprises mutually substantially parallel roller guide surface portions and mutually convergent roller guide surface portions.

17. The circulating roller bearing as defined in claim 16, wherein:
the bearing block is formed of a plastic material.

* * * * *

UNITED STATES PATENT AND TRADEMARK OFFICE
CERTIFICATE OF CORRECTION

PATENT NO. : 4,547,023
DATED : October 15, 1985
INVENTOR(S) : Albrecht Blatter

It is certified that error appears in the above—identified patent and that said Letters Patent is hereby corrected as shown below:

Column 2, line 9, after "manufactured" please insert --with--

Column 6, line 62, please delete "structurespreventing" and insert --structures preventing--

Signed and Sealed this

Seventh Day of January 1986

[SEAL]

Attest:

DONALD J. QUIGG

Attesting Officer

Commissioner of Patents and Trademarks